J. BECKER.
MILLING AND OTHER MACHINES.
APPLICATION FILED AUG. 21, 1912.
1,248,794.
Patented Dec. 4, 1917.
2 SHEETS—SHEET 1.
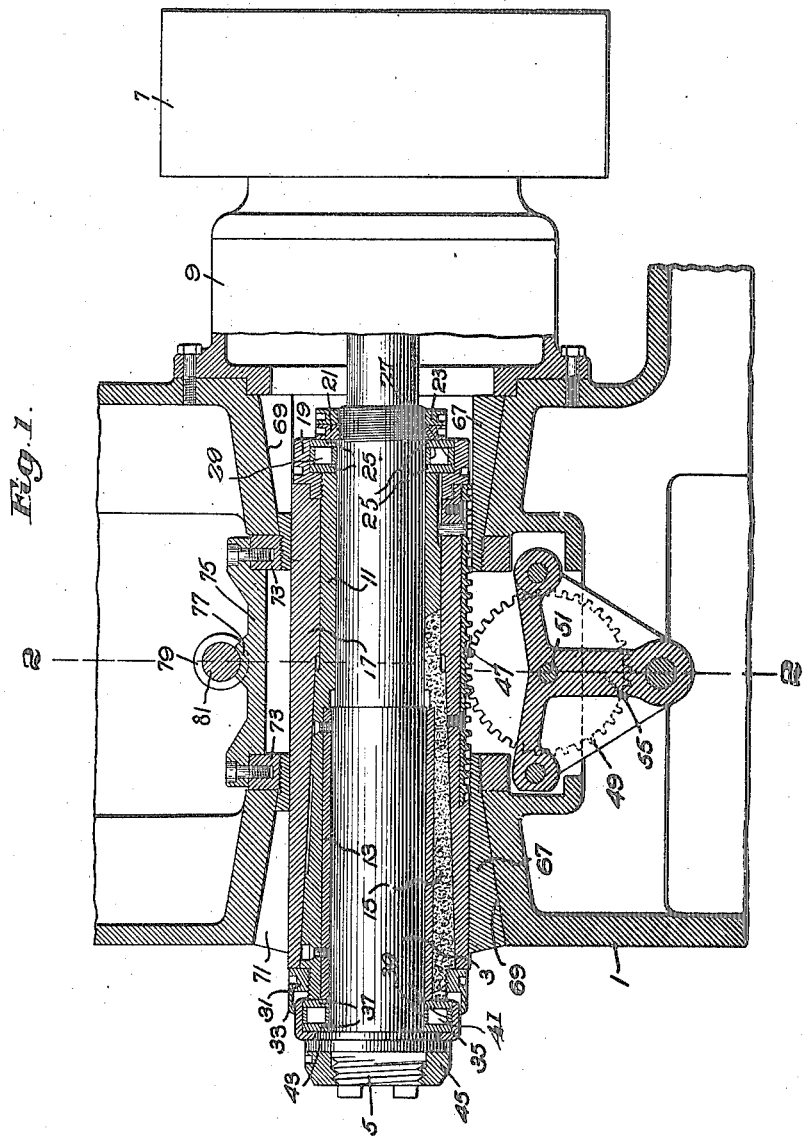
Witnesses:
Horace A. Crossman
Carl L. Choate.
Inventor:
John Becker.
by Emery, Booth, Janney & Varney
Attys.

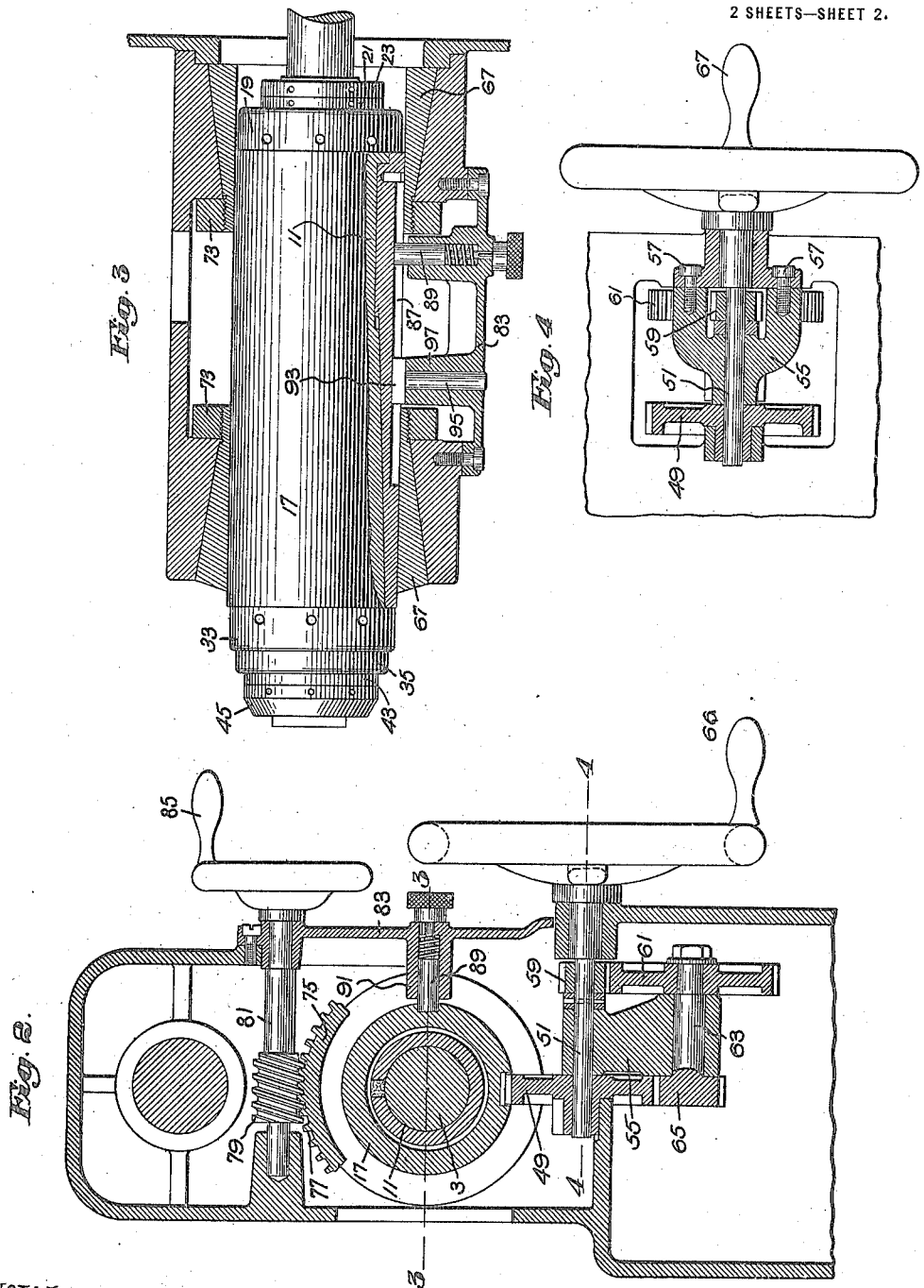

UNITED STATES PATENT OFFICE.

JOHN BECKER, OF HYDE PARK, MASSACHUSETTS, ASSIGNOR TO BECKER MILLING MACHINE COMPANY, OF HYDE PARK, MASSACHUSETTS, A CORPORATION OF MASSACHUSETTS.

MILLING AND OTHER MACHINES.

1,248,794.      Specification of Letters Patent.      Patented Dec. 4, 1917.

Application filed August 21, 1912. Serial No. 716,143.

*To all whom it may concern:*

Be it known that I, JOHN BECKER, a citizen of the United States, and a resident of Hyde Park, in the county of Norfolk and Commonwealth of Massachusetts, have invented an Improvement in Milling and other Machines, of which the following description, in connection with the accompanying drawings, is a specification, like characters on the drawings representing like parts.

This invention relates to milling and other machines, and among other objects, provides means for securely holding the spindle in different positions of longitudinal adjustment.

The character of the invention may be best understood by reference to the following description of an illustrative embodiment thereof shown in the accompanying drawings wherein:

Figure 1 is a view partly in elevation and partly in section of a mechanism illustrating the invention;

Fig. 2 is a vertical transverse section taken on line 2—2 of Fig. 1;

Fig. 3 is a horizontal section taken on line 3—3 of Fig. 2; and

Fig. 4 is a horizontal section taken on line 4—4 of Fig. 2.

Referring to the drawings, the illustrative mechanism therein shown as embodying the invention comprises a standard 1 (Fig. 1), shown partly broken away and constituting a support for a horizontal spindle 3 having a usual tool receiving end 5 and at its opposite end a pulley 7 for driving the same through intermediate gears (not shown) contained in a casing 9 suitably secured to said standard.

The spindle 3 is journaled in a bearing comprising an inner sleeve 11 recessed to receive a lining 13 of Babbitt metal or other suitable bearing material and split to leave a space 15 for receiving oil absorbing felt or other packing. The sleeve 11 is received by an outer bearing sleeve 17. To connect the latter with the spindle so that longitudinal movement of the sleeve 17 may be shared by the sleeve 11, friction reducing limiting devices are provided at opposite ends of the sleeves. At one end is a shoulder ring 19 encircling said spindle and abutting against said sleeve. The spindle 3 is provided with a threaded portion receiving an adjusting nut 21 and a lock nut 23. Interposed between the locking ring 19, the end of the inner sleeve 11 and the adjusting nut 21, are bearing rings 25 and 27 forming a housing inclosing rollers 29 for reducing the friction of the end thrust of the parts.

At the opposite end is a locking nut 31 threaded to a reduced end of the nose of the inner sleeve 11, and abutting against the end of the outer sleeve. This nut has a lip 33 projecting therefrom receiving a flanged ring 35 inclosing roller bearing rings 37, 39, forming a housing inclosing rollers 41. To position the flanged ring 35, a ring 43 is provided held in position by a nut 45 threaded to the nose of the spindle.

By the above construction, the bearing sleeves and spindle are locked against relative longitudinal movement while permitting free rotation of the spindle.

To feed or adjust the bearing and spindle longitudinally, the outer sleeve of the former is recessed to receive a rack plate 47 secured thereto and meshing with a gear 49 loose on a shaft 51 journaled in a three-web frame 55 secured to the standard by screws 57 (Fig. 4). Preferably the gear 49 is not rotated directly from said shaft 51. To this end, intermediate speed reducing gearing is provided (Fig. 2) comprising a pinion 59 fast on the shaft 51 driving a larger gear 61 fast on a stud countershaft 63 journaled in the vertical web of the frame 55. The drive is transmitted from this countershaft 63 to the gear 49 referred to by a pinion 65 fast on said countershaft. The shaft 51 projects somewhat beyond the standard casing and receives an operating handle 66. By turning this handle, through the train of gears described, the bearing sleeve rack may be moved longitudinally and the spindle may be fed or adjusted to any position desired.

Hitherto, so far as I am aware, considerable difficulty has been experienced in holding the spindle in different positions of longitudinal adjustment so that it will be accurately maintained in proper alinement and without any liability of play or rocking, which necessarily would produce inferior work. By my invention a device is provided for securely holding the spindle in various positions of longitudinal adjustment with none of the objections referred to. To this end, means is provided for gripping or locking the bearing described to the standard at distributed points along the bearing. The illustrative means shown herein as embodying the invention comprises collets 67 (Fig. 1) on the outer bearing sleeve 17. Portions of these collets are tapered or formed with inclined outer surfaces for coöperation with oppositely flaring bosses 69 conveniently formed in the standard. To permit the collets to grip or release the bearing, they are split or made discontinuous as at 71. The collets have sufficient resilience so that when adjusted toward one another, they tighten on the bearing and at the same time are set tightly in the flaring bosses 69 of the frame and thus rigidly lock the bearing thereto. To adjust the collets toward one another, their adjacent ends may be exteriorly and oppositely threaded to rings 73. To impart a turning movement to both of the rings 73 simultaneously in order to draw the collets toward one another, said rings are connected by a bridge member or sector 75. On the back of said sector is a threaded rib 77 engaging a worm 79 fast on a shaft 81 journaled in boss bearings, one integral with the standard 1 and the other in a removal plate 83. The shaft 81 projects somewhat beyond the latter and receives an operating wheel handle 85.

By the above described construction, when it is desired to clamp or release the collets it is merely necessary to turn the handle 85 which will operate through the worm and bridge to transmit a turning movement to the rings 73 which, being oppositely threaded to the collets 67, will move the same toward or from one another longitudinally of the spindle and securely clamp or release the spindle bearing as desired.

To prevent rotary movement of the bearing while permitting longitudinal movement thereof, the outer bearing sleeve is provided with a longitudinal groove 87 (Fig. 3) adapted to receive a spring pressed spline 89 in a boss 91 in the cover plate 83 referred to.

To further resist any rotative movement of the bearing, a fixed spline may be provided having an elongated head 93 (Fig. 3) occupying the groove 87 and a shank 95 in a boss 97 projecting inwardly from the detachable plate 83 referred to.

In use, if it is desired to shift the spindle to any longitudinal position of adjustment, first the handle 85 is turned, and acting through the worm 79 will rock the bridge and spread the clamping collets. The latter, owing to their inherent resilience, will expand in the flaring bosses 69 and release the bearing. The adjusting handle 67 is then turned and through the gearing described will shift the bearing longitudinally, and with it the spindle, to the desired position. The clamp handle 85 is then again grasped and turned to draw the collets 67 toward one another, thereby wedging them toward the narrower ends of the flaring bosses. This causes the collets to contract into tight engagement both with the bearing and with said bosses. As a result, the spindle is securely held in its proper longitudinal position. As stated, the collets are preferably arranged to grip the bearing at points distributed along the latter so they not only offer a means for securely locking the bearing against longitudinal movement, but also prevent any rocking or chattering of the spindle. However, in some instances a single clamping collet might be used if desired.

The conical construction of the clamping collets and bosses is very advantageous for a variety of reasons. Among others, the collets when adjusted toward one another actuately center themselves into the conical bosses. As a result the spindle is always properly centered and alined in all of its positions of adjustment. The taper or wedge shape of the parts also lend themselves advantageously for the taking up or compensation for wear on the parts.

The mechanism is strong, simple in construction and operation, and is not liable to get out of repair.

While the locking device shown herein is illustrated in connection with a horizontal spindle, it will be understood that it is not limited in its application thereto, but its field of use may be extended to other spindles or rotative means.

Having described one illustrative embodiment of the invention without limiting the invention thereto, what I claim as new and desire to secure by Letters Patent is:

1. A machine of the class described, comprising in combination, a standard 1, a rotative spindle 3, a bearing sleeve 17 for said spindle, means for causing said spindle and sleeve to move together in the direction of their axis, and means including members 67 for gripping said sleeve to said standard in different positions of axial adjustment.

2. A machine of the class described comprising in combination, a standard, a spindle, a bearing sleeve for said spindle, means for causing said spindle and sleeve to move together in the direction of their axis, said standard having means for receiving said sleeve, and wedge means coöperating therewith for clamping said sleeve securely thereto in various positions of axial adjustment.

3. A machine of the class described comprising in combination, a standard, a spindle, a bearing sleeve for said spindle, means for causing said spindle and sleeve to move together in the direction of their axis, said standard having portions formed to receive said spindle, and wedge shaped collets interposed between said portions and said sleeve for clamping the latter in different positions of axial adjustment.

4. A machine of the class described comprising in combination, a standard, a spindle, a bearing sleeve for said spindle, means for causing said spindle and sleeve to move together in the direction of their axis, said standard having portions for receiving said sleeve, wedge members interposed between said portions and said sleeve for gripping the latter at different points along the same, and means for simultaneously adjusting said members into clamping and releasing positions.

5. A machine of the class described comprising in combination, a standard, a spindle, a bearing sleeve therefor, means for causing said spindle and sleeve to move together in the direction of their axis, said standard having portions for receiving said sleeve, split collets, and means for adjusting the same to clamp said sleeve to said portions in different positions of axial adjustment.

6. A machine of the class described comprising in combination, a standard, a spindle, a bearing sleeve therefor, means for causing said spindle and sleeve to move together in the direction of their axis, and means for securing said sleeve in different positions of axial adjustment including split clamping collets having provision for causing them to tend to spring away from said sleeve.

7. A machine of the class described comprising in combination, a standard, a spindle, a bearing sleeve therefor, means for causing said spindle and sleeve to move together in the direction of their axis, said standard having portions for receiving said sleeve, and tapered clamping collets interposed between said sleeve and said portions and having provision tending to cause them to expand away from said sleeve toward said portions.

8. A machine of the class described comprising in combination, a standard, a spindle, a bearing sleeve therefor, means for causing said spindle and sleeve to move together in the direction of their axis, said standard having portions for receiving said sleeve, and means for securing said sleeve in different positions of axial adjustment including collets interposed between said sleeve and said portions having an inherent resilience tending to cause them to spring away from said sleeve.

9. A machine of the class described comprising in combination, a standard, a spindle, a bearing sleeve therefor, means for causing said spindle and sleeve to move axially together, and means for holding said sleeve in different positions of axial adjustment including a wedge shaped member interposed between said sleeve and a portion of said standard and means for adjusting said member axially of said sleeve to secure and release the latter.

10. A machine of the class described comprising in combination, a standard, a spindle, a bearing sleeve therefor, means to cause said spindle and sleeve to move together in the direction of their axis, and means coöperating with said standard for gripping said sleeve thereto in different positions of axial adjustment.

11. A machine of the class described comprising in combination, a standard, a spindle, a bearing sleeve therefor, means including collars adjacent opposite ends of said sleeve for causing said sleeve and spindle to move axially together, and means for clamping said sleeve to said standard in different positions of axial adjustment.

In testimony whereof, I have signed my name to this specification, in the presence of two subscribing witnesses.

JOHN BECKER.

Witnesses:
EVERETT S. EMERY,
BERTHA DAVID.

Copies of this patent may be obtained for five cents each, by addressing the "Commissioner of Patents, Washington, D. C."